(12) United States Patent
Koch et al.

(10) Patent No.: US 10,343,523 B2
(45) Date of Patent: Jul. 9, 2019

(54) OPERATING UNIT FOR AN IN-VEHICLE SYSTEM

(71) Applicant: FORD GLOBAL TECHNOLOGIES, LLC, Dearborn, MI (US)

(72) Inventors: Raphael Koch, Odenthal (DE); Stefan Wolter, Wuerselen (DE)

(73) Assignee: Ford Global Technologies, LLC, Dearborn, MI (US)

( * ) Notice: Subject to any disclaimer, the term of this patent is extended or adjusted under 35 U.S.C. 154(b) by 4 days.

(21) Appl. No.: 15/839,149

(22) Filed: Dec. 12, 2017

(65) Prior Publication Data

US 2018/0194230 A1 Jul. 12, 2018

(30) Foreign Application Priority Data

Jan. 9, 2017 (DE) .................... 10 2017 200 197

(51) Int. Cl.
| | |
|---|---|
| *G06F 3/033* | (2013.01) |
| *B60K 37/06* | (2006.01) |
| *G06F 3/01* | (2006.01) |
| *G06F 3/044* | (2006.01) |
| *B60K 35/00* | (2006.01) |
| *G06F 3/041* | (2006.01) |

(52) U.S. Cl.
CPC ............. *B60K 37/06* (2013.01); *B60K 35/00* (2013.01); *G06F 3/016* (2013.01); *G06F 3/041* (2013.01); *G06F 3/044* (2013.01); *B60K 2370/126* (2019.05); *B60K 2370/131* (2019.05); *B60K 2370/1438* (2019.05); *B60K 2370/152* (2019.05); *B60K 2370/52* (2019.05)

(58) Field of Classification Search
CPC .. B60K 37/06; B60K 35/00; B60K 2350/352; B60K 2350/102; B60K 2350/1028; G06F 3/016; G06F 3/041; G06F 3/044
See application file for complete search history.

(56) References Cited

U.S. PATENT DOCUMENTS

2007/0267283 A1* 11/2007 Hiroe ................ H01H 5/02
200/179
2008/0211779 A1 9/2008 Pryor
(Continued)

FOREIGN PATENT DOCUMENTS

| | | |
|---|---|---|
| CN | 202995673 U | 6/2013 |
| DE | 4035011 C2 | 10/1994 |
| DE | 102008040755 A1 | 2/2010 |

*Primary Examiner* — Nelson M Rosario
*Assistant Examiner* — Andrew Lee
(74) *Attorney, Agent, or Firm* — Brooks Kushman P.C.; Frank Lollo

(57) ABSTRACT

The disclosure relates to an operating unit for an in-vehicle system to control an operation of at least one in-vehicle electric device of a vehicle. The operating unit includes at least one touch screen, at least one rotary knob that is arranged on the touchscreen and at least one shaft that extends through the touchscreen and is connected in a non-rotatable manner to the rotary knob. In order to simplify operation of the operating unit via haptic feedback from the operating unit, the operating unit comprises at least one electromagnetic latching arrangement that is connected to the shaft and renders it possible to latch different rotary positions of the rotary knob in a non-contact manner.

20 Claims, 4 Drawing Sheets

(56) References Cited

U.S. PATENT DOCUMENTS

2013/0147729 A1* 6/2013 Lim .................. G06F 3/0482
 345/173
2015/0355768 A1 12/2015 Kuwahara et al.
2017/0371429 A1* 12/2017 Tsai .................. G06F 3/0362

* cited by examiner

OPERATING UNIT FOR AN IN-VEHICLE SYSTEM

CROSS-REFERENCE TO RELATED APPLICATIONS

This application claims foreign priority benefits under 35 U.S.C. § 119(a)-(d) to DE Application 10 2017 200 197.6 filed Jan. 9, 2017, which is hereby incorporated by reference in its entirety.

TECHNICAL FIELD

The disclosure relates to an operating unit for an in-vehicle system to control an operation of at least one in-vehicle electric device of a vehicle.

BACKGROUND

It is known to arrange a touchscreen on a central console of a vehicle in order to be able to operate an infotainment system of the vehicle via the touchscreen. This use of a touchscreen is advantageous since the touchscreen can be used both to display information and, also, as an input unit. Touchscreens of ever increasing sizes are being installed in vehicles. In addition, the mentioned use of a touchscreen has the advantage that it is increasingly possible to forego physical knobs and buttons since these are replaced by the touchscreen.

One disadvantage of using a touchscreen in the described manner is that when operating the touchscreen, a user does not receive any haptic feedback that he would otherwise receive when actuating knobs and buttons. In order, nonetheless, to be able to provide the user with feedback regarding the operation of the touchscreen, it is known to provide the user with a visual or acoustic feedback or a haptic feedback via vibrations when using a touchscreen.

In addition, it is not possible in the case of a conventional touchscreen to feel the presence of a (virtual) knob on the touchscreen and this makes it difficult to locate said knob. Since by way of example a driver of a vehicle that is equipped with such a touchscreen must visually check whether he has performed an intended operation of the touchscreen or whether the touchscreen has detected the intended operation, the driver is distracted by the procedure of operating the touchscreen, which results in the vehicle being driven in a dangerous manner with zero-visibility since the driver is unable to observe the road and the traffic while operating the touchscreen.

US 2008/0211779 A1 discloses a device that renders it possible to control vehicles in a reconfigurable manner. Physical operating elements and operating elements that are indicated in a virtual manner on a touchscreen are used individually or in combination in order to render it possible to improve the visibility and provide better understanding of the control information and to render the operating elements easier to use, which is particularly useful in stressful situations. The position of a physical operating element that is arranged in a rotatable manner on the touchscreen is detected optically. The physical operating element is arranged on the touchscreen in such a manner that it can be moved via a shaft that extends through the touchscreen and is connected in a non-rotatable manner to the physical operating element.

The object of the disclosure is to provide an in-vehicle operating unit for an in-vehicle system to control an operation of at least one in-vehicle electric device of a vehicle, which is simple to use as a result of the haptic feedback from the operating unit.

SUMMARY

This object is achieved by virtue of the independent claims. Advantageous embodiments are disclosed in the description hereinunder, the dependent claims and the figures, wherein these embodiments taken in each case individually or in a different combination of at least two of these embodiments with one another can represent a further-developed, in particular, also preferred or advantageous aspect of the disclosure. Embodiments of the operating unit can correspond to embodiments of the in-vehicle system and of the vehicle and conversely, even if not explicitly referred to in the individual case hereinunder.

An operating unit in accordance with the disclosure for an in-vehicle system to control an operation of at least one in-vehicle electric device of a vehicle comprises at least one touchscreen, at least one rotary knob that is arranged on the touchscreen, at least one shaft that extends through the touchscreen and is connected in a non-rotatable manner to the rotary knob and at least one electromagnetic latching arrangement that is connected to the shaft and can be used to latch different rotatory positions of the rotary knob in a non-contact manner.

In accordance with the disclosure, the operating unit can be operated—in addition to being operated via the touchscreen—via at least one physical rotary knob that is arranged in a rotatable manner on the touchscreen. A user, by way of example a driver, can feel the rotary knob without having to visually check whether he actually touched the rotary knob. In addition, as a result of the latching arrangement of the different rotary positions of the rotary knob, the user receives haptic feedback regarding the respective actuation of the rotary knob with the result that the user can actuate the rotary knob blind. Consequently, the procedure of operating the in-vehicle operating unit in accordance with the disclosure is simplified as a result of the haptic feedback from the operating unit. This means in particular that a driver is not distracted whilst operating the operating unit with the result that the vehicle is not driven in a dangerous manner with zero-visibility.

The operating unit in accordance with the disclosure can also comprise two or multiple rotary knobs that are arranged in a rotatable manner on the touchscreen and are connected in each case in a non-rotatable manner to a dedicated shaft that extends through the touchscreen. Each shaft can be connected to a dedicated electromagnetic latching arrangement that renders it possible to latch different rotary positions of the respective rotary knob in a non-contact manner.

The in-vehicle system can also be configured so as to control the operation of two or multiple in-vehicle electric device(s). By way of example, the in-vehicle system can be configured as an infotainment system that renders it possible to control a temperature control unit, an air-conditioning system, an acoustic information or media playback unit, a frequency on a car radio, a navigation system and the like.

In accordance with one advantageous embodiment, the latching arrangement comprises at least one permanent magnet, which is connected in a non-rotatable manner to the shaft, and multiple electromagnets that are arranged circumferentially around the axis of rotation in a radially outward manner with respect to an axis of rotation. The permanent magnet is moved along the electromagnets by virtue of rotating the rotary knob. The electromagnets are energized in order to render it possible to latch the different rotary positions of the rotary knob. The electromagnets are preferably arranged uniformly offset with respect to one another in the circumferential direction. The maximum number of possible latchable positions of the rotary knob is determined by the number of electromagnets.

In accordance with a further advantageous embodiment, the operating unit comprises at least one electronics assembly that is connected to the latching arrangement and is configured so as to control the latching arrangement in such a manner that an angle of rotation between adjacent latchable rotary positions of the rotary knob can be varied in dependence upon a variable function assignment of the rotary knob. The electronics assembly is connected to the electromagnets of the latching arrangement in order to be able to control said electromagnets in an electrical manner. It is possible by varying the number of the electromagnets that are to be energized via the electronics assembly to vary the angle of rotation between adjacent latchable rotary positions of the rotary knob in dependence upon a variable function assignment of the rotary knob. It is possible by way of example to energize only each second, third, fourth or fifth electromagnet. It is possible by varying the angle of rotation between adjacent latchable rotary positions of the rotary knob to adjust the sensitivity of the operating procedure. It is possible to set a high degree of sensitivity of operation of the rotary knob, by way of example, if the rotary knob is assigned a function for adjusting a temperature in the passenger compartment or a volume strength. A low degree of sensitivity of the operation of the rotary knob can be set, by way of example, if the rotary knob is assigned a function to select from an options menu a vehicle electric device that is to be controlled.

In accordance with a further advantageous embodiment, the electronics assembly is configured so as to perform a function assignment of the rotary knob in dependence upon a function that is selected via the touchscreen. A user can select, via the touchscreen, a specific function assignment of the rotary knob. This selection is detected by the electronics assembly. The electronics assembly controls the electromagnets according to the respectively selected function.

In accordance with a further advantageous embodiment, the operating unit comprises at least one device that detects an axial actuation of the rotary knob, wherein the rotary knob is arranged on the touchscreen in such a manner as to be able to move along the axis of rotation and is prestressed in the direction facing away from the touchscreen. This means that the rotary knob can also be used in addition as a push button, by way of example, by axially actuating the rotary knob to confirm a respective selection that has been made by rotating the rotary knob or to make a specific selection. The device that detects that the rotary knob has been actuated in an axial manner can comprise, by way of example, a pressure switch or a pressure sensor that is connected to the electronics assembly.

In accordance with a further advantageous embodiment, the touchscreen comprises at least one through-going passage that receives the shaft. The through-going passage can have a polygonal or circular cross-sectional area. It is possible to arrange, at the through-going passage, a radial bearing that supports the rotary knob in a rotatable manner on the touchscreen.

In accordance with a further advantageous embodiment, the touchscreen comprises at least two touchscreen parts that are connected to one another, wherein at least one through-going passage is arranged between the touchscreen parts and the shaft extends through said touchscreen parts. It is possible to initially separate the touchscreen parts from one another so as to assemble the operating unit and, subsequently once the shaft has been arranged on one of the two touchscreen parts, to re-connect said touchscreen parts. It is preferred that the two touchscreen parts are connected to one another in such a manner that the separation line between the two touchscreen parts is not visible or is hardly visible. One touchscreen part can, by way of example, form a corner of a touchscreen that is formed by the two touchscreen parts and is provided with an edge-side cut-out that forms the through-going passage on the touchscreen. It is possible to arrange at the through-going passage a radial bearing that supports the rotary knob in a rotatable manner on the touchscreen.

An in-vehicle system in accordance with the disclosure to control an operation of at least one in-vehicle electric device of a vehicle comprises at least one operating unit in accordance with one of the aforementioned embodiments or a random combination of at least two of these embodiments with one another.

The advantages that are mentioned above with regard to the operating unit are associated accordingly with the in-vehicle system. It is also possible using the in-vehicle system to control the operation of two or multiple electric devices of the vehicle.

In accordance with one advantageous embodiment, the in-vehicle system is configured as an infotainment system.

A vehicle in accordance with the disclosure comprises at least one in-vehicle system in accordance with one of the aforementioned embodiments or a combination thereof.

The advantages mentioned above with regard to the operating unit or the in-vehicle system are associated accordingly with the vehicle.

In accordance with one advantageous embodiment, the operating unit is arranged on a central console of the vehicle. However, it is also possible to arrange the operating unit in the rear of the vehicle or at least in a position where it can be accessed by a passenger in the rear of the vehicle so that it can be operated by passengers in the rear of the vehicle.

The disclosure is explained in an exemplary manner with reference to the preferred embodiments with the aid of the attached figures, wherein the features illustrated hereinunder can represent both as stand-alone or also in various combinations with one another an aspect that is a further development of the disclosure. In the drawings:

DETAILED DESCRIPTION

As required, detailed embodiments of the present disclosure are disclosed herein; however, it is to be understood that the disclosed embodiments are merely exemplary of the disclosure that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present disclosure.

Figure 1:
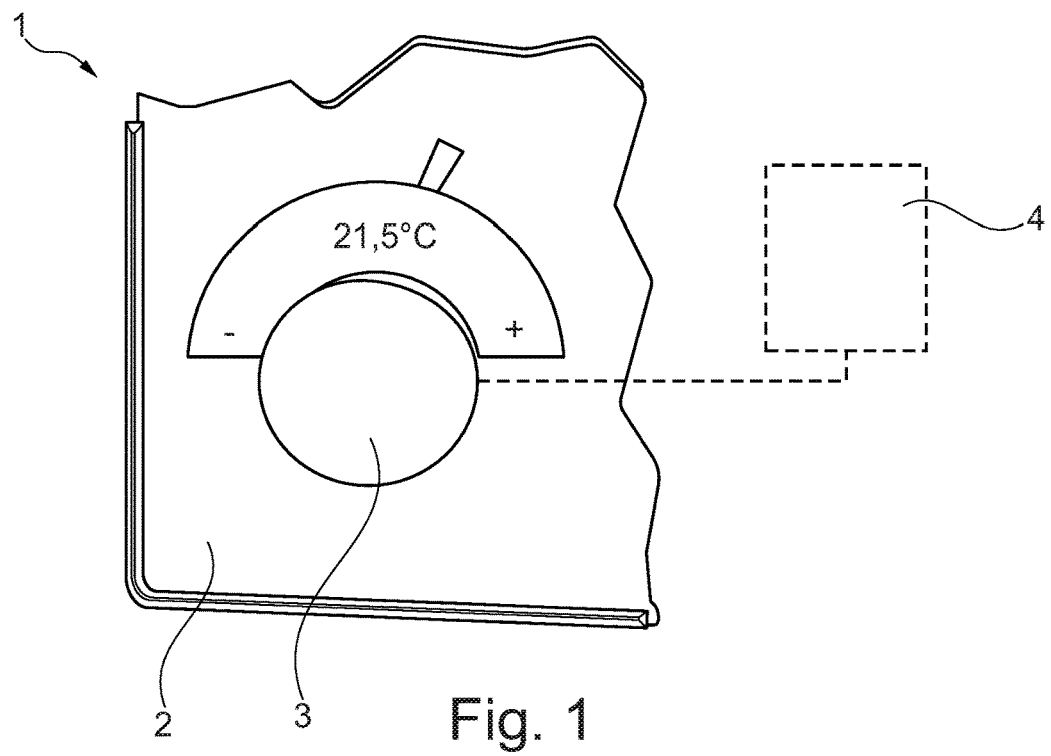
FIG. 1 illustrates a schematic view of a section of one exemplary embodiment for an operating unit in accordance with the disclosure with a first function assignment.

FIG. 1 illustrates a schematic view of a section of an exemplary embodiment for an operating unit 1 in accordance with the disclosure for an in-vehicle system (not illustrated) to control an operation of at least one in-vehicle electric device (not illustrated) of a vehicle (not illustrated).

The operating unit 1 comprises a touchscreen 2, a rotary knob 3 that is arranged on the touchscreen 2, a shaft (not illustrated), which extends through the touchscreen 2 and is connected in a non-rotatable manner to the rotary knob 3, and an electromagnetic latching arrangement (not illustrated), that is connected to the shaft and can latch different rotary positions of the rotary knob 3 in a non-contact manner. The touchscreen 2 comprises a through-going passage (not illustrated) and the shaft extends through said through-going passage. FIG. 1 illustrates a first function assignment of the operating unit 1 or of the rotary knob 3, wherein it is possible to adjust the temperature of the passenger compartment by means of rotating the rotary knob 3. It is also possible using the rotary knob 3 in FIG. 1 to adjust or control an electronic device of the vehicle in the form of an air-conditioning system.

The latching arrangement comprises at least one permanent magnet (not illustrated) that is connected to the shaft in a non-rotatable manner, and multiple electromagnets (not illustrated) that are arranged circumferentially around the axis of rotation radially outwards with respect to an axis of rotation of the shaft. The latching arrangement can be configured by way of example according to FIG. 6.

The operating unit 1 comprises an electronics assembly 4 that is connected to the latching arrangement and is configured so as to control the latching arrangement in such a manner that an angle of rotation between adjacent latchable rotary positions of the rotary knob 3 can be varied in dependence upon a variable function assignment of the rotary knob 3. The electronics assembly 4 is configured so as to perform a function assignment of the rotary knob 3 in dependence upon a function (in this case the temperature control function) that is selected via the touchscreen 2.

The operating unit 1 can comprise a device (not illustrated) to detect an axial actuation of the rotary knob 3, wherein the rotary knob 3 is arranged on the touchscreen 2 in such a manner as to be able to move along the axis of rotation and can be prestressed in a direction that is facing away from the touchscreen 2.

Figure 2:
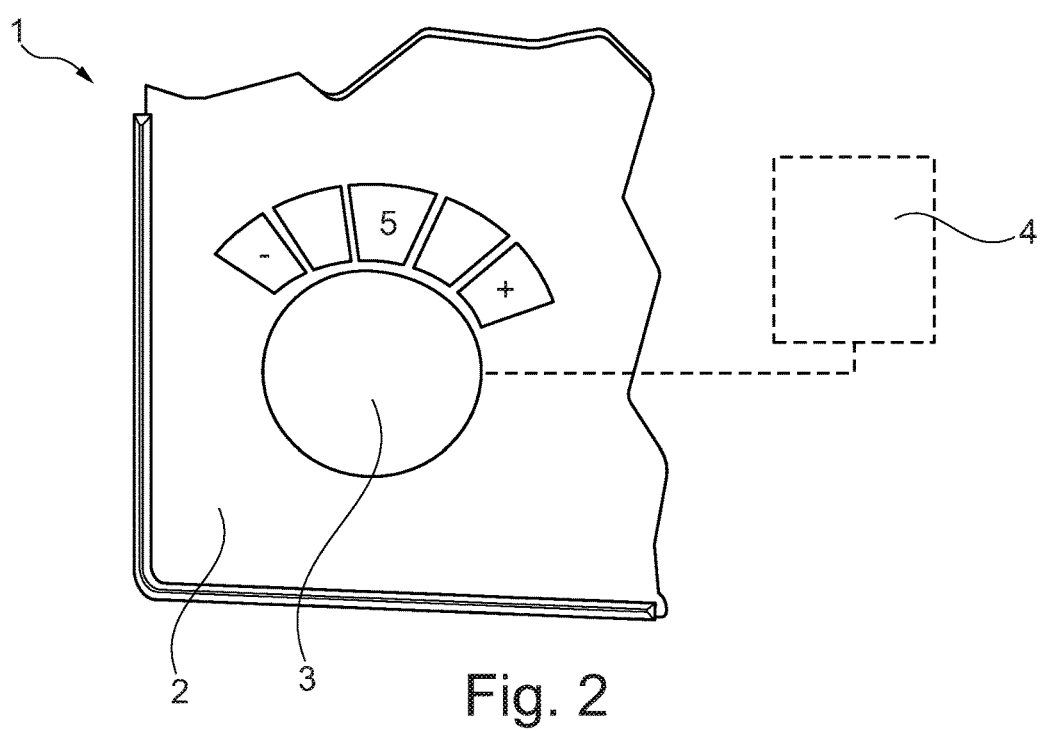
FIG. 2 illustrates a schematic view of the operating unit illustrated in FIG. 1 with a second function assignment.

FIG. 2 illustrates a schematic view of the operating unit 1 illustrated in FIG. 1 with a second function assignment of the rotary knob 3. The second function assignment of the rotary knob 3 renders it possible to adjust a volume by means of rotating the rotary knob 3. It is thus possible using the rotary knob 3 in FIG. 2 to adjust or control an electronic device of the vehicle in the form of a car radio or a navigation system.

Figure 3:
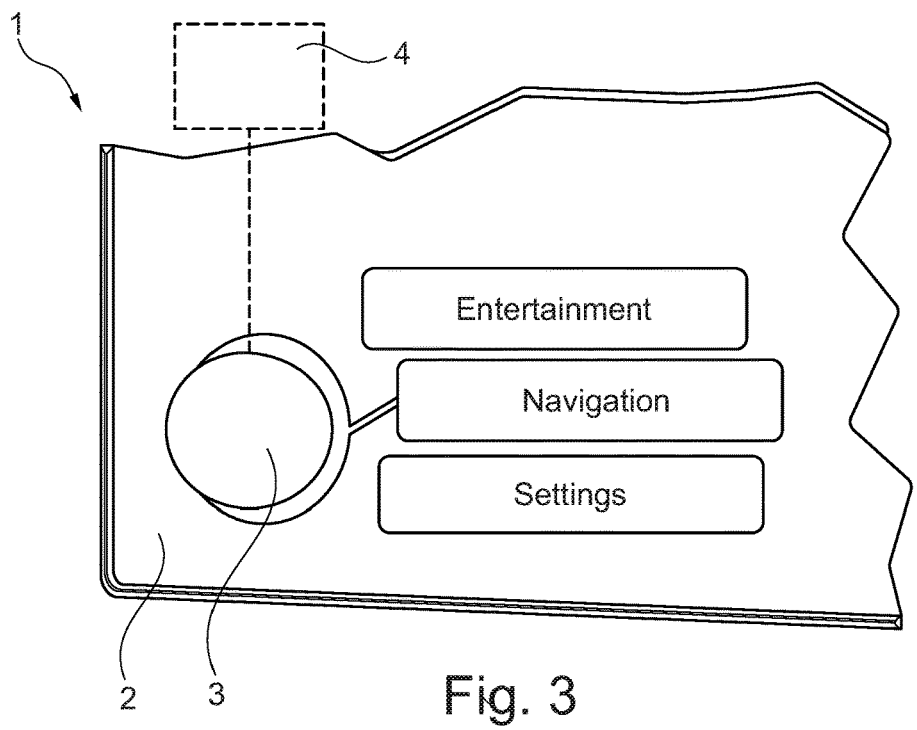
FIG. 3 illustrates a schematic view of the operating unit illustrated in FIG. 1 with a third function assignment.

FIG. 3 illustrates a schematic view of the operating unit 1 illustrated in FIG. 1 with a third function assignment of the rotary knob 3. The third function assignment of the rotary knob 3 renders it possible to temporarily select one of three different menu options by rotating the rotary knob 3, wherein one menu option is allocated to an electric device in the form of an entertainment system, a further menu option is allocated to an electric device in the form of a navigation system and a further menu option is allocated to a settings menu. In order to make the final selection of one of the menu options that have been temporarily selected, it is possible to actuate the rotary knob 3 as a push button, in that the rotary knob is actuated in an axial manner. Following the final selection of a menu option that is allocated to an electric device, it is possible by rotating the rotary knob 3 to adjust parameters of the electric device that has been selected in this manner.

Figure 4:
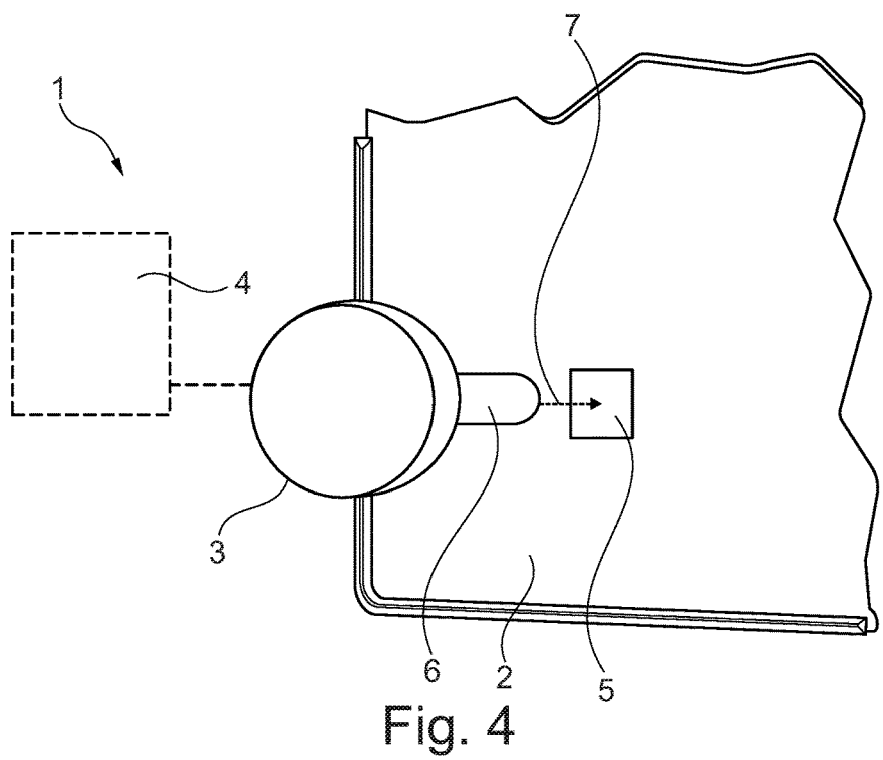
FIG. 4 illustrates a schematic view of an assembly state of the operating unit illustrated in FIG. 1.

FIG. 4 illustrates a schematic view of an assembly state of the operating unit 1 illustrated in FIG. 1. FIG. 4 illustrates the through-going passage 5 on the touchscreen 2 and the shaft 6 that is connected in a non-rotatable manner to the rotary knob 3. In order to attach the rotary knob 3 to the touchscreen 2, the shaft 6 is inserted into the through-going passage 5 as illustrated by the arrow 7.

Figure 5:
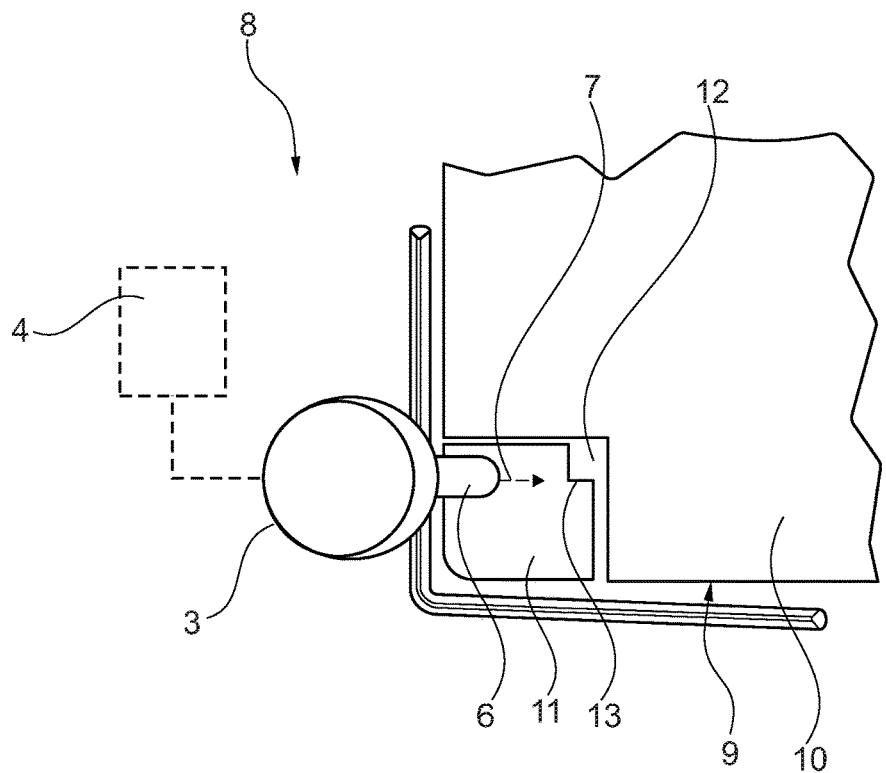
FIG. 5 illustrates a schematic view of an assembly state of a further exemplary embodiment for an operating unit in accordance with the disclosure.

FIG. 5 illustrates a schematic view of an assembly state of a further exemplary embodiment for an operating unit 8 in accordance with the disclosure. The operating unit 8 differs from the exemplary embodiment illustrated in FIGS. 1 to 4 in that the touchscreen 9 comprises two touchscreen parts 10 and 11, wherein a through-going passage 12 is arranged between the touchscreen parts 10 and 11 and the shaft 6 extends through said through-going passage if the shaft is inserted into the through-going passage 12 as illustrated by the arrow 7. The touchscreen part 11 forms a corner of the touchscreen 9. A cutout 13 is arranged on one corner of the touchscreen part 11 and said cutout essentially forms the through-going passage 12. In order to avoid repetitions, reference is made to the above descriptions relating to FIGS. 1 to 4.

Figure 6:
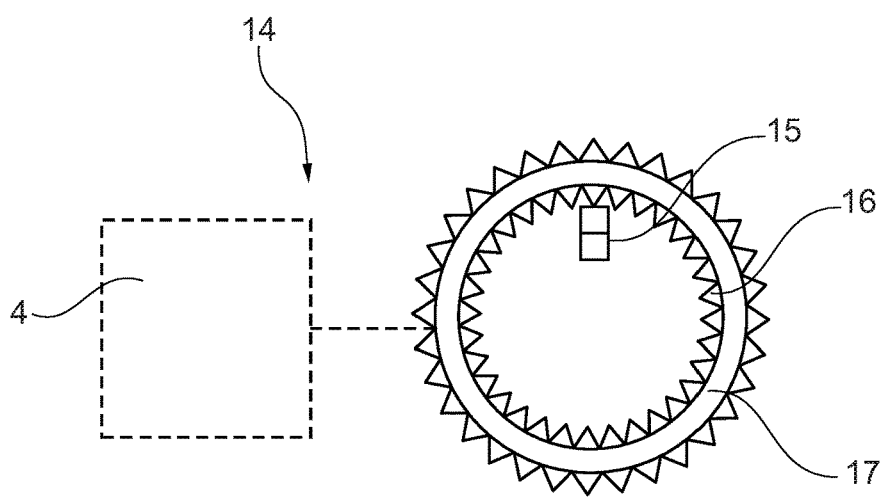
FIG. 6 illustrates a schematic view of an exemplary embodiment for a latching arrangement in accordance with the disclosure.

FIG. 6 illustrates a schematic view of an exemplary embodiment for a latching arrangement 14 in accordance with the disclosure. The latching arrangement 14 comprises a permanent magnet 15 that is connected in a non-rotatable manner to the shaft (not illustrated), and multiple electromagnets 16 that are arranged circumferentially around the axis of rotation in a radially outward manner with respect to an axis of rotation and are arranged on a common iron ring 17. The latching arrangement 14 or its electromagnets 16 is/are connected to the electronics assembly 4 in order for said electronics assembly to be able to control said latching arrangement.

Figure 7:
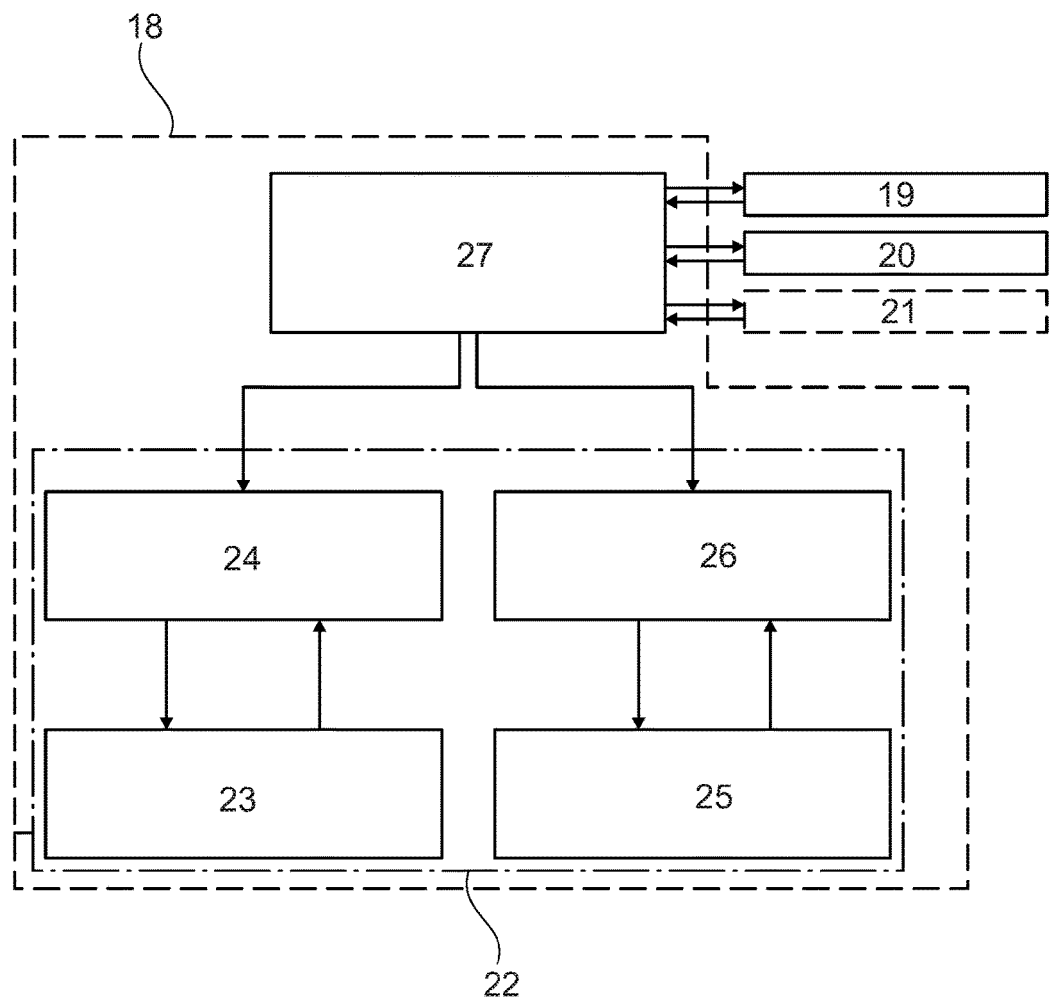
FIG. 7 illustrates a schematic view of an exemplary embodiment for an in-vehicle system in accordance with the disclosure.

FIG. 7 illustrates a schematic view of an exemplary embodiment for an in-vehicle system 18 in accordance with the disclosure to control an operation of in-vehicle electric devices 19, 20 and 21 of a vehicle (not illustrated). The in-vehicle system 18 comprises an operating unit 22 that can be configured according to the FIGS. 1 to 6. The in-vehicle system 18 is configured as an infotainment system.

The operating unit 22 comprises a touchscreen 23, a touchscreen control unit 24 that is connected to the touchscreen 23, a rotary knob 25 that is arranged in a rotatable manner on the touchscreen 23 and a rotary knob control unit 26 that is connected to the rotary knob 25. The touchscreen 23 receives signals from the touchscreen control unit 24 so as to control the information that is to be respectively transmitted by the touchscreen 23. The touchscreen control unit 24 receives signals from the touchscreen 23 with respect to an input that has been performed by a user at the touchscreen 23. The latching arrangement (not illustrated)

that is connected to the rotary knob 25 receives signals from the rotary knob control unit 26 so as to control the electromagnets and, consequently, so as to perform a procedure of latching different rotary positions of the rotary knob 25 in a variable manner. The rotary knob control unit 26 receives signals from the latching arrangement with respect to the respective latched rotary position of the rotary knob 25. The touchscreen control unit 24 and the rotary knob control unit 26 form the electronics assembly of the operating unit 22.

The touchscreen control unit 24 and the rotary knob control unit 26 are connected to a central electronic control assembly 27 of the in-vehicle system 18. The central electronic control assembly 27 is connected in a bidirectional manner to the individual electric devices 19 to 21, wherein more than three electric devices 19 to 21 can be present.

While exemplary embodiments are described above, it is not intended that these embodiments describe all possible forms of the disclosure. Rather, the words used in the specification are words of description rather than limitation, and it is understood that various changes may be made without departing from the spirit and scope of the disclosure. Additionally, the features of various implementing embodiments may be combined to form further embodiments of the disclosure.

What is claimed is:

1. An operating unit for an in-vehicle system to control an operation of at least one in-vehicle electric device, comprising:
    a touchscreen;
    a rotary knob that is arranged on the touchscreen;
    a shaft that extends through the touchscreen, the shaft being non-rotatably connected to the knob;
    an electromagnetic latching arrangement with a permanent magnet non-rotatably connected to the shaft and a plurality of electromagnets arranged circumferentially around an axis of rotation of the shaft in a radially outward direction with respect to the axis of rotation, the electromagnetic latching arrangement configured to allow different latched rotary positions of the rotary knob in a non-contact manner relative to the touchscreen; and
    at least one electronics assembly connected to the latching arrangement and configured to, in response to a variable function assignment of the rotary knob, control the latching arrangement by varying a number of the plurality of electromagnets to be energized such that an angle of rotation between adjacent latchable rotary positions of the rotary knob is varied.

2. The operating unit as claimed in claim 1, wherein the electronics assembly is configured to perform a function assignment of the rotary knob depending upon a function selected via the touchscreen.

3. The operating unit as claimed in claim 1 further comprising at least one axial actuation detection device of the rotary knob, wherein the rotary knob is arranged on the touchscreen such that the rotary knob moves along an axis of rotation, and is pre-stressed in a direction that is facing away from the touchscreen.

4. The operating unit as claimed in claim 1, wherein the touchscreen defines at least one through-going passage that receives the shaft.

5. The operating unit as claimed in claim 1, wherein the touchscreen is formed from a first touchscreen part and a second touchscreen part that are assembled along a separation line, wherein at least one through-going passage is positioned along the separation line, arranged between the touchscreen parts and receives the shaft.

6. An in-vehicle control system comprising:
    an operating unit including a rotary knob arranged on a touchscreen and non-rotatably connected to a rotary shaft, the rotary shaft extending through and supported by a radial bearing positioned in a passage defined by the touchscreen, and an electromagnetic latching arrangement configured to electromagnetically latch the rotary knob and rotary shaft in predefined positions relative to the touchscreen without contacting the rotary knob and rotary shaft.

7. The in-vehicle control system as claimed in claim 6, wherein the operating unit is configured as an infotainment system.

8. The in-vehicle control system as claimed in claim 6, wherein the latching arrangement includes a permanent magnet that is non-rotatably connected to the shaft, and a plurality of electromagnets arranged circumferentially around an axis of rotation of the shaft in a radially outward direction with respect to the axis of rotation.

9. The in-vehicle control system as claimed in claim 8 further comprising an electronics assembly connected to the latching arrangement, and configured to control the latching arrangement such that an angle of rotation between adjacent, latchable positions of the rotary knob are varied depending upon a variable function assignment of the rotary knob.

10. The in-vehicle control system as claimed in claim 9, wherein the electronics assembly is configured to perform a function assignment of the rotary knob depending upon a function selected via the touchscreen.

11. The in-vehicle control system as claimed in claim 6 further comprising an axial actuation detection device of the rotary knob, wherein the rotary knob is arranged on the touchscreen such that the rotary knob moves along an axis of rotation, and is prestressed in a direction that is facing away from the touchscreen.

12. The in-vehicle control system as claimed in claim 6, wherein the touchscreen defines a through passage that receives the shaft.

13. The in-vehicle control system as claimed in claim 6, wherein the touchscreen includes two touchscreen parts that are assembled to one another along a separation line, wherein the passage and the radial bearing are arranged between the touchscreen parts and along the separation line.

14. A vehicle, comprising:
    an in-vehicle control system; and
    an operating device connected to the in-vehicle control system and being internal to the vehicle, and having a touchscreen and rotary knob on the touchscreen, wherein a shaft extends through the touchscreen such that an electromagnetic latching arrangement, connected to the shaft, allows different, non-contact positions of the rotary knob relative to the touchscreen, the shaft being non-rotatably connected to the rotary knob, wherein the electromagnetic latching arrangement includes a permanent magnet non-rotatably connected to the shaft and a plurality of electromagnets arranged circumferentially around an axis of rotation of the shaft in a radially outward direction with respect to the axis of rotation, the permanent magnet spaced apart from an axis of rotation of the shaft, the permanent magnet having first and second opposite ends, the first end positioned between the axis of rotation and the second end.

15. The vehicle as claimed in claim 14, wherein the operating device is arranged on a central console of the vehicle.

16. The vehicle as claimed in claim 14 further comprising an electronics assembly connected to the latching arrangement, and configured to control the latching arrangement such that an angle of rotation between adjacent, latchable positions of the rotary knob are varied depending upon a variable function assignment of the rotary knob, the electronics assembly increasing a number of the plurality of electromagnets to be simultaneously energized to decrease the angle of rotation between adjacent, latchable positions of the rotary knob.

17. The vehicle as claimed in claim 16, wherein the electronics assembly is configured to perform a function assignment of the rotary knob depending upon a function selected via the touchscreen.

18. The operating unit as claimed in claim 1, wherein the touchscreen defines a through-going passage that receives the shaft, wherein a radial bearing is positioned at the through-going passage to support the rotary knob in a rotatable manner on the touchscreen.

19. The in-vehicle control system as claimed in claim 9 wherein the electronics assembly is further configured to control the latching arrangement by varying a number of the plurality of electromagnets to be simultaneously energized to vary the angles of rotation between adjacent latchable positions of the rotary knob.

20. The in-vehicle control system as claimed in claim 9 wherein the electronics assembly is further configured to control the latching arrangement by increasing a number of the plurality of electromagnets to be simultaneously energized to decrease the angles of rotation between adjacent latchable positions of the rotary knob.

* * * * *